US012596024B2

(12) United States Patent
Fowler et al.

(10) Patent No.: US 12,596,024 B2
(45) Date of Patent: Apr. 7, 2026

(54) ULTRASONIC METER WITH SINGLE TRANSDUCER

(71) Applicant: Neptune Technology Group LLC, Wilmington, DE (US)

(72) Inventors: Jeffrey M. Fowler, Lawrenceville, GA (US); Mahesh Matam, Cumming, GA (US); David Hamilton, Auburn, AL (US); Nicholas Russell Winston, Norcross, GA (US)

(73) Assignee: Neptune Technology Group LLC, Tallassee, AL (US)

( * ) Notice: Subject to any disclaimer, the term of this patent is extended or adjusted under 35 U.S.C. 154(b) by 452 days.

(21) Appl. No.: 18/347,648

(22) Filed: Jul. 6, 2023

(65) Prior Publication Data

US 2024/0011810 A1     Jan. 11, 2024

Related U.S. Application Data

(60) Provisional application No. 63/367,825, filed on Jul. 7, 2022.

(51) Int. Cl.
*G01F 1/667* (2022.01)
(52) U.S. Cl.
CPC ................................... *G01F 1/667* (2013.01)
(58) Field of Classification Search
CPC ....................................................... G01F 1/667
USPC ..................................................... 73/861.28
See application file for complete search history.

(56) References Cited

U.S. PATENT DOCUMENTS

| | | | | |
|---|---|---|---|---|
| 5,655,537 | A | * | 8/1997 | Crowley ............. G01S 15/8979 |
| | | | | 600/446 |
| 6,584,860 | B1 | * | 7/2003 | Feller ...................... G01F 1/106 |
| | | | | 73/861.25 |
| 6,862,253 | B2 | | 3/2005 | Blosser et al. |
| 6,904,798 | B2 | | 6/2005 | Boucher et al. |
| 7,027,936 | B2 | | 4/2006 | Ploug-Soerensen et al. |
| 7,167,415 | B2 | | 1/2007 | Neeson et al. |
| 7,752,919 | B2 | | 7/2010 | Straub, Jr. |
| 7,767,159 | B2 | | 8/2010 | Glotov |
| 7,841,243 | B1 | * | 11/2010 | Feller ...................... G01F 1/668 |
| | | | | 73/861.27 |
| 8,019,559 | B1 | | 9/2011 | Stevens et al. |
| 8,181,536 | B2 | | 5/2012 | Augenstein et al. |
| 8,342,736 | B2 | | 1/2013 | Luotola et al. |
| 8,472,651 | B2 | | 6/2013 | Pompei |
| 8,806,957 | B2 | | 8/2014 | Laursen et al. |

(Continued)

*Primary Examiner* — Nathaniel T Woodward
(74) *Attorney, Agent, or Firm* — Fish & Richardson P.C.

(57) ABSTRACT

A metering system uses an electronics assembly with a single transducer to determine flow rate. The meter assembly emits an ultrasonic beam from the transducer and splits the ultrasonic beam into a first partial beam and a second partial beam. The first partial beam is transmitted over a first path that returns to the electronics assembly, and the second partial beam is transmitted over a second path that returns to the electronics assembly. The first path goes over a first net distance of a measuring channel. The second path goes over a second net distance of the measuring channel. The meter assembly detects the return of the first partial beam and the second partial beam, measures a time difference between the return times, and determines a measurement of a fluid flow through the measuring channel based on the time difference.

20 Claims, 6 Drawing Sheets

(56)　　　　　　References Cited

U.S. PATENT DOCUMENTS

| | | | |
|---|---|---|---|
| 9,182,260 B2 | 11/2015 | Nielsen et al. | |
| 9,557,201 B2 | 1/2017 | Drachmann | |
| 9,568,347 B2 | 2/2017 | Drachmann | |
| 9,633,833 B2 | 4/2017 | Wang et al. | |
| 9,658,090 B2 | 5/2017 | Nielsen | |
| 9,726,528 B2 | 8/2017 | Drachmann | |
| 9,889,243 B2 | 2/2018 | Kelly et al. | |
| 9,933,291 B2 | 4/2018 | Drachmann | |
| 10,458,824 B2 | 10/2019 | Kroemer et al. | |
| 10,488,238 B2 | 11/2019 | Drachmann | |
| 10,605,646 B2 | 3/2020 | Drachmann | |
| 2011/0132102 A1* | 6/2011 | Ueberschlag | G01F 1/662 |
| | | | 73/861.27 |
| 2015/0020608 A1* | 1/2015 | Chevrier | H02H 9/005 |
| | | | 73/861.31 |
| 2019/0368908 A1 | 12/2019 | Aughton et al. | |
| 2020/0086347 A1 | 3/2020 | Hirao et al. | |
| 2020/0109978 A1 | 4/2020 | Campbell et al. | |
| 2020/0182930 A1 | 6/2020 | Lal et al. | |
| 2020/0300679 A1 | 9/2020 | Kroemer | |
| 2020/0326216 A1 | 10/2020 | Sarkissian | |
| 2021/0033585 A1 | 2/2021 | Dempster | |
| 2021/0048329 A1 | 2/2021 | Wusterbarth et al. | |
| 2021/0055153 A1 | 2/2021 | Forster-Knight et al. | |

* cited by examiner

Emit ultrasonic beam

Split ultrasonic beam into partial beams

Direct first partial beam over first path through stationary medium and measuring channel Direct second partial beam over second path through stationary medium and measuring channel Detect return of partial beams Measure return time difference Identify flow rate based on time difference 600
610
620
630
640
650
660
670

ULTRASONIC METER WITH SINGLE TRANSDUCER

CROSS-REFERENCE TO RELATED APPLICATION

This application claims priority under 35 U.S.C. § 119, based on U.S. Provisional Patent Application No. 63/367,825 filed Jul. 7, 2022, titled "Ultrasonic Meter with Single Transducer," the disclosure of which is hereby incorporated by reference.

BACKGROUND OF THE INVENTION

The present application relates generally to meters that measure flow rate of a fluid and more specifically to water meters and gas meters that use ultrasonic transducers for flow measurements.

Water and gas meters are typically used to measure usage at a consumption site for billing and/or monitoring purposes. Meter measurements are directly tied to revenue, which makes measurement integrity and reliability of every meter a high priority. Traditional water and gas meters operate using transducer pairs that direct ultrasonic signals back and forth through a measuring channel.

DETAILED DESCRIPTION OF THE PREFERRED EMBODIMENTS

Figure 1:
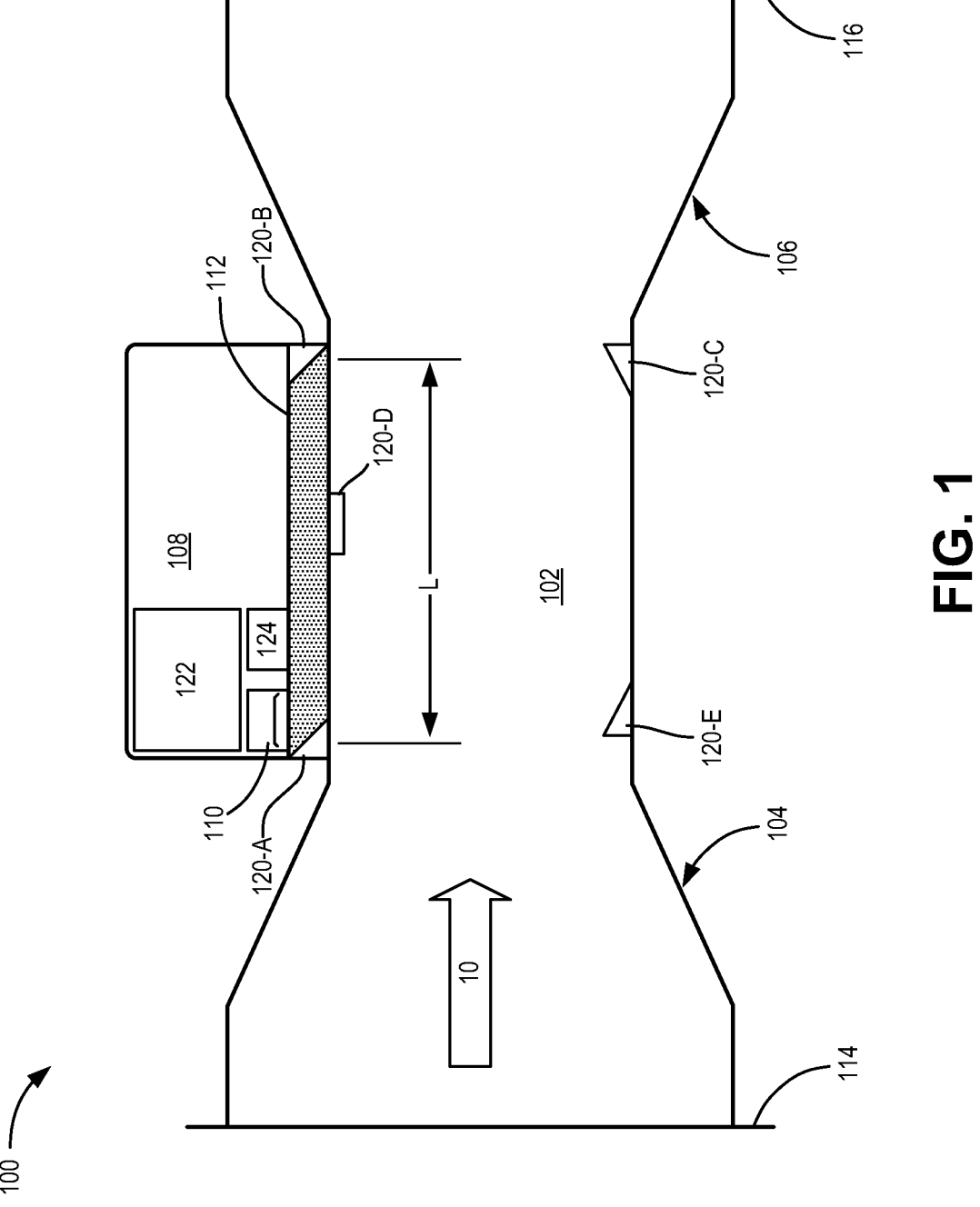
FIG. 1 is a schematic longitudinal cross-sectional view of a meter assembly, according to an implementation.

The following detailed description refers to the accompanying drawings. The same reference numbers in different drawings identify the same or similar elements.

Traditional ultrasonic meters use two transducers, paired with one upstream of the other, to measure signal time-of-flight through a fluid. A flow of the fluid in the downstream direction will reduce the time of flight for a signal emitted from the upstream transducer and received by the downstream transducer. Conversely, the same flow will increase the time of flight for a signal emitted from the downstream transducer and received by the upstream transducer. The difference in the time of flight in the two directions will be approximately proportional to the flow rate. The transducer pair arrangement may be replicated in a flow meter, for example with four transducers arranged in two pairs, each pair operating as above. Each cooperating pair of transducers may be designated as a channel. Thus, a flow meter may be a one-channel flow meter having two transducers, or it may be a two-channel flow meter having four transducers.

While other multi-transducer arrangements are possible, currently only channels involving the interoperation of transducer pairs have been realized.

Ultrasonic flow meters as described above meet various functional requirements. For example, water meters may have requirements for measuring fluid flow at a prescribed interval (e.g., 250 milliseconds (ms)), at a prescribed accuracy (e.g., ±1.5%), over a prescribed range of flow rates (e.g., 0.1 to 20 gallons per minute), for a designed service life supported by a battery or battery pack without recharging (e.g., 10 years), with the capability to distinguish forward flow from reverse flow. The ultrasonic transducers and associated electronics represent a considerable portion of the cost of production of an ultrasonic meter. Reducing the number of transducers per channel from 2 to 1 would enable a reduced cost of production, and may also enable an improved tradeoff among sampling interval, service life, and the size of the battery or battery pack.

However, substitution of a single transducer for a conventional transducer pair presents challenges. For example, suppose a single transducer transmits an ultrasonic signal along a beam path through the fluid, with the beam path comprising at least one portion in a downstream direction, and at least one portion in an upstream direction. The problem with this concept is that the reduction of time of flight in the downstream direction is entirely cancelled out, or nearly so, by the increase in time of flight in the upstream direction, relative to the flow of the fluid in the downstream direction. Thus, the total time of flight is unaffected by the flow rate in that changes in time of flight will be small in proportion to changes in flow rate. Any effect would be subtle and difficult to measure accurately, particularly at low flow rates.

Implementations described herein provide an ultrasonic meter design that uses a single transducer per channel, and which generates a signal that is readily analyzed and sufficiently sensitive to flow rate to constitute a measure of flow rate for a fluid (e.g., water, natural gas, etc.) according to functional requirements, such as those described above.

Systems and methods described herein provide a meter assembly that uses a single transducer to measure flow rates of a fluid. The meter assembly splits an ultrasonic beam from the transducer into a first partial beam and a second partial beam. The partial beams pass through a measuring channel using different paths that eventually return to the transducer. Each of the partial beams also traverse through a medium (e.g., a stationary or non-flowing medium) that is unaffected by fluid flow through the metering channel. The stationary medium allows the paths of the partial beams to traverse the measuring channel in only one of two primary directions (e.g., upstream or downstream). In one implementation, a first path goes through the stationary medium and traverses upstream through the measuring channel. A second path traverses downstream through the measuring channel and then returns through the stationary medium. The meter assembly may detect the return of the first partial beam and the second partial beam, measure a time difference between the return times, and identify a fluid flow rate through the measuring channel based on the time difference.

FIG. 1 is a schematic longitudinal cross-sectional view of a meter assembly 100 illustrating an embodiment described herein. A measuring channel 102 is positioned between an inlet section 104 and an outlet section 106. An electronics module 108 may include an ultrasonic transducer 110 and other equipment to measure the flow rate of fluid (e.g., water, gas, etc.) through measuring channel 102. Meter assembly 100 may also include a stationary medium 112 and a set of reflectors 120-A, 120-B, 120-C, 120-D, and 120-E (referred to herein collectively as "reflectors 120" or generically as "reflector 120").

Meter assembly 100 may be dimensioned to fit inline within a selected pipe system (e.g., a particular pipe diameter). An inlet flange 114 of inlet section 104 may be bolted, for example, to a corresponding flange (not shown) of the piping system, and an outlet flange 116 of outlet section 106 may be bolted, for example, to another corresponding flange (not shown) of the piping system, such that fluid flows through meter assembly 100 in a desired flow direction, shown as arrow 10. Measuring channel 102 may have a substantially circular cross-section, a substantially rectangular cross-section, or another cross-sectional shape. Thus, in some implementations, inlet section 104 may transition from a larger circular cross-section (e.g., at flange 114) to a smaller non-circular cross-section (e.g., a substantially rectangular cross-section) at measuring channel 102. In other implementations, inlet section 104 may transition from a larger circular cross-section to a smaller circular cross-section. Outlet section 106 may correspondingly transition from the smaller cross-section of measuring channel 102 back to a larger circular cross-section (e.g., at flange 116).

Electronics module 108 may include, for example, a transducer 110, a battery 122, and a processing unit 124. Transducer 110 may be configured to emit a single ultrasonic beam (e.g., signals, pulses, wave packets, etc.) and detect arrival of partial beams that are directed back to transducer 110. The received signal strength of each partial beam may be lower in proportion to the emitted signal strength of the transmitted beam due to splitting of the beam. However, transducer 110 and/or processing unit 124 may be configured to detect and account for the lower magnitude of the received partial beams.

Battery 122 may power transducer 110 and processing unit 124. For example, battery 122 may be configured to provide power to support periodic flow readings (e.g., 250 ms, 500 ms, etc.) for a required service life (e.g., 5 years, 10 years, etc.).

Processing unit 124 may be used to interpret signals from transducer 110 and compute, for example, flow rate through measuring channel 102. In one implementation, processing unit 124 may include one or more application-specific integrated circuits (ASICs), field-programmable gate arrays (FPGAs), or the like. In other implementations, the processing unit may include a processor, microprocessor, microcontroller, or other logic and a memory to store instructions.

As described further herein, electronics module 108 may interpret different transit times (also referred to as "time of flight") of a split beam generated by the single transducer 110 in a manner to determine the flow rate. Electronics module 108 may detect different transit times of the partial beams that are reflected through measuring channel 102 in different directions. For example, processing unit 124 may associate a first partial beam with a first beam path having a first path length and associate a second partial beam with a second beam path having a second path length. According to one implementation, electronics module 108 may provide near-simultaneous measurement of flow rate based on the detected time differences and the known configuration/ dimensions of the split beam paths through reflectors 120.

Stationary medium 112 may include a portion of electronics module 108 and/or measuring channel 102 that is not altered by flow 10 through measuring channel 102. In other implementations, stationary medium 112 may be included as a separate component of meter assembly 100 or included in combination with electronics module 108 or measuring channel 102. Stationary medium 112 may include, for example, plastic or another solid material, or a region of fluid (e.g., water, gas, etc.) which is substantially stationary regardless of any net fluid flow through measuring channel 102.

Reflectors 120 may include a material with high acoustic reflectivity, such as steel or stainless steel. Reflectors 120 may be in the form of flat surfaces, focusing mirrors (e.g., spherical focusing mirrors, ellipsoidal focusing minors, cylindrical focusing mirrors), Fresnel mirrors, other reflective shapes, and/or combinations thereof. According to implementations described herein, reflectors 120 may be arranged in measuring channel 120 and/or electronics module 108 to direct beams (e.g., signals, pulses, wave packets, etc.) on one or more measurement paths that begin and terminate at ultrasonic transducer 110.

As described further herein, a beam from transducer 110 may be split into two partial beams and reflected such that the partial beams may travel through measuring channel 102 in substantially opposite paths. Each partial beam may be directed along a path back to the transducer 110. A portion of each partial beam's path traverses through stationary medium 112 and another portion of each partial beam's path traverses through measuring channel 102. The net streamwise distance, L, through stationary medium along the path of the partial beam may be substantially different from zero. Similarly, the net streamwise distance through the measuring channel 102 along the path of the partial beam may be substantially different from zero, equal and opposite of L. Distance, L, may vary in proportion to a product type/size of meter assembly 100, ranging, for example, between about 1.5 inches (3.81 cm) and 7.5 inches (19.05 cm) The time of flight along the portion of the path of the partial beam through stationary medium 112 is insensitive to (or not affected by) the flow rate. Conversely, the time of flight along the portion of the path of the partial beam through measuring channel 102 is sensitive to (or affected by) the flow rate. Because each of the partial beams traverse measuring channel 102 in different directions, the sensitivity to flow rate of the total time of flight of the first partial beam is substantially different to the sensitivity to flow rate of the total time of flight of the second partial beam.

Figure 2:
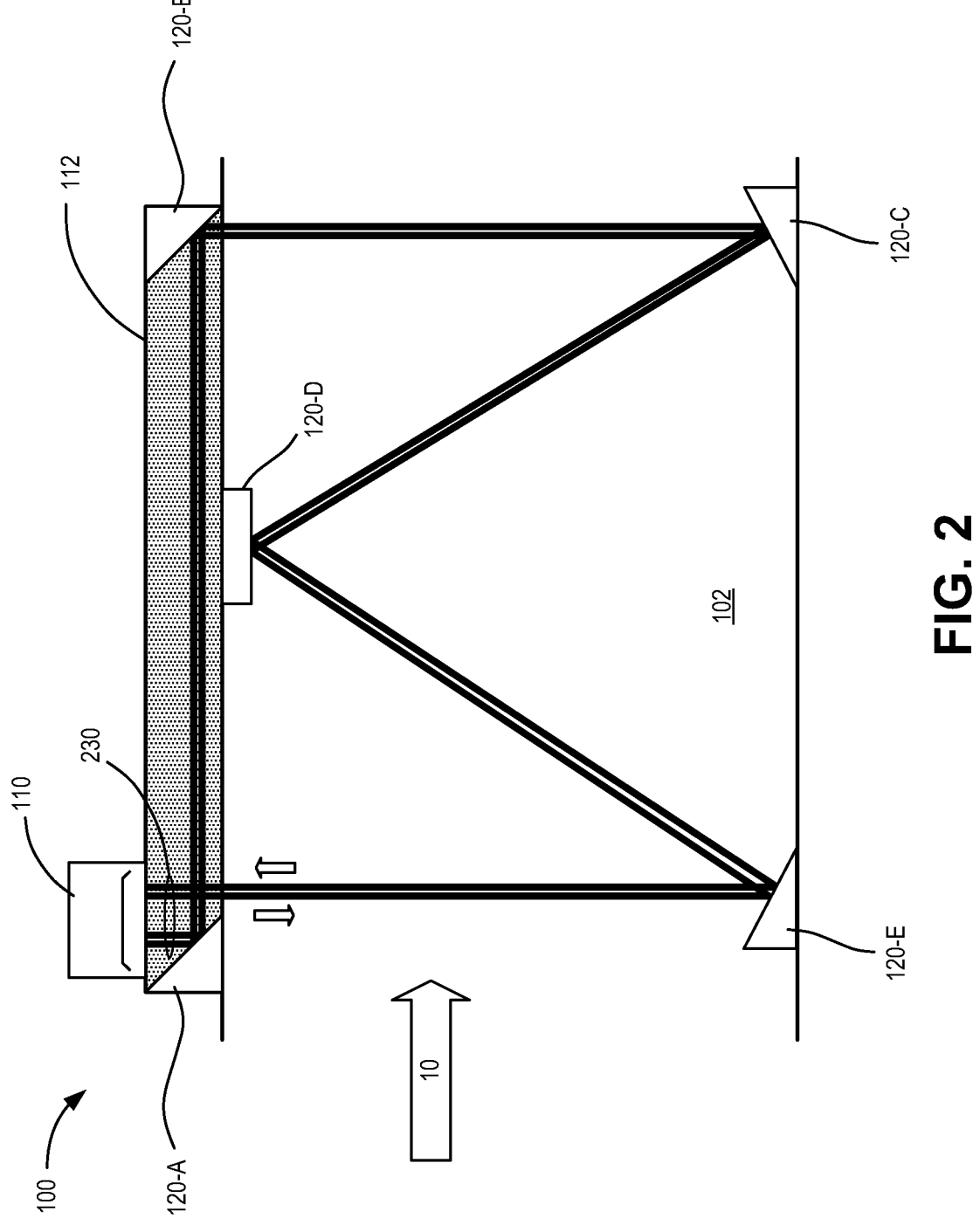
FIG. 2 is a schematic view of a portion of the meter assembly of FIG. 1, illustrating partial beam paths of equal length, according to an implementation.

FIG. 2 is an enlarged schematic view of a portion 200 of meter assembly 100 illustrating partial beam paths of equal length from transducer 110, according to an implementation. As shown in FIG. 2, ultrasonic transducer 110 may emit a beam 230. Beam 230 may be split into two partial beams using a beam splitter, such as an arrangement of one or more reflectors 120. In one implementation, beam 230 may be split by having a reflector 120 (e.g., reflector 120-A) positioned in front of transducer 110 in a manner that does not entirely obstruct beam 230. In other implementations, a reflector 120 may act as a beam-splitter by having two different surfaces that reflect beam 230 in different directions. In still another implementation, the beam-splitter may include a reflector 120 configured as a partial reflector which is positioned to entirely obstruct beam 230, but partially reflects or deflects the beam and allows a portion of the beam to pass through.

In the example configuration of FIG. 2, reflector 120-A may be positioned such that a first portion of beam 230 from transducer 110 is initially reflected off reflector 120-A, while a second portion of beam 230 initially bypasses reflector 120-A to reflect off reflector 120-E. Thus, the acoustic reflectors 120 reflect the two partial beams of ultrasonic beam 230 from transducer 110 along opposite measurement paths, of equal distance, back to transducer 110. More particularly, when transducer 110 emits a beam 230, a first partial beam gets reflected from reflector 120-A and follows the path of reflectors 120 ABCDE (e.g., substantially clockwise), while a second partial beam bypasses reflector 120-A and follows the path of reflectors EDCBA (e.g., substantially counter-clockwise).

Flow rate measurements through measurement channel 102 may be determined using the arrangement of FIG. 2 as follows. In the following discussion, Q is the flow rate. To an approximation, the first partial beam takes a time f to travel from reflector 120-A to 120-B, a time g+h*Q to travel from reflector 120-C to 120-D to 120-E, a time m to travel from reflector 120-B to 120-C, and another time m to travel from reflector 120-E back to transducer 110. This approximation provides for a total time of flight (TOF$_1$) of:

$$TOF_1 = f + g + h*Q + 2*m.$$

Similarly, the second partial beam takes a time g−h*Q to travel from 120-E to 120-D to 120-C, a time f to travel from 120-B to 120-A, a time m to travel from transducer 110 to 120-E, and another time m to travel from 120-C to 120-D, for a total time of flight (TOF$_2$) of:

$$TOF_2 = f + g − h*Q + 2*m.$$

Thus, the delta time of flight (ΔTOF) for the two partial beams is approximately:

$$\Delta TOF = 2*h*Q.$$

From ΔTOF, a measurement of the flow rate may be determined in a manner similar that of systems that use traditional transducer pairs. That is, the difference in the upstream and downstream flight times may be applied to the geometry of the reflectors and measuring channel to calculate flow rate of fluid in measuring channel 102.

The embodiment of FIG. 2 enables meter assembly 100 to impute the absolute value of flow rate Q, but as described this arrangement does not identify the sign of delta time of flight, nor the sign of Q (e.g., upstream or downstream direction). Thus, flow rate may be indicated as an absolute (directionless) value.

Figure 3:
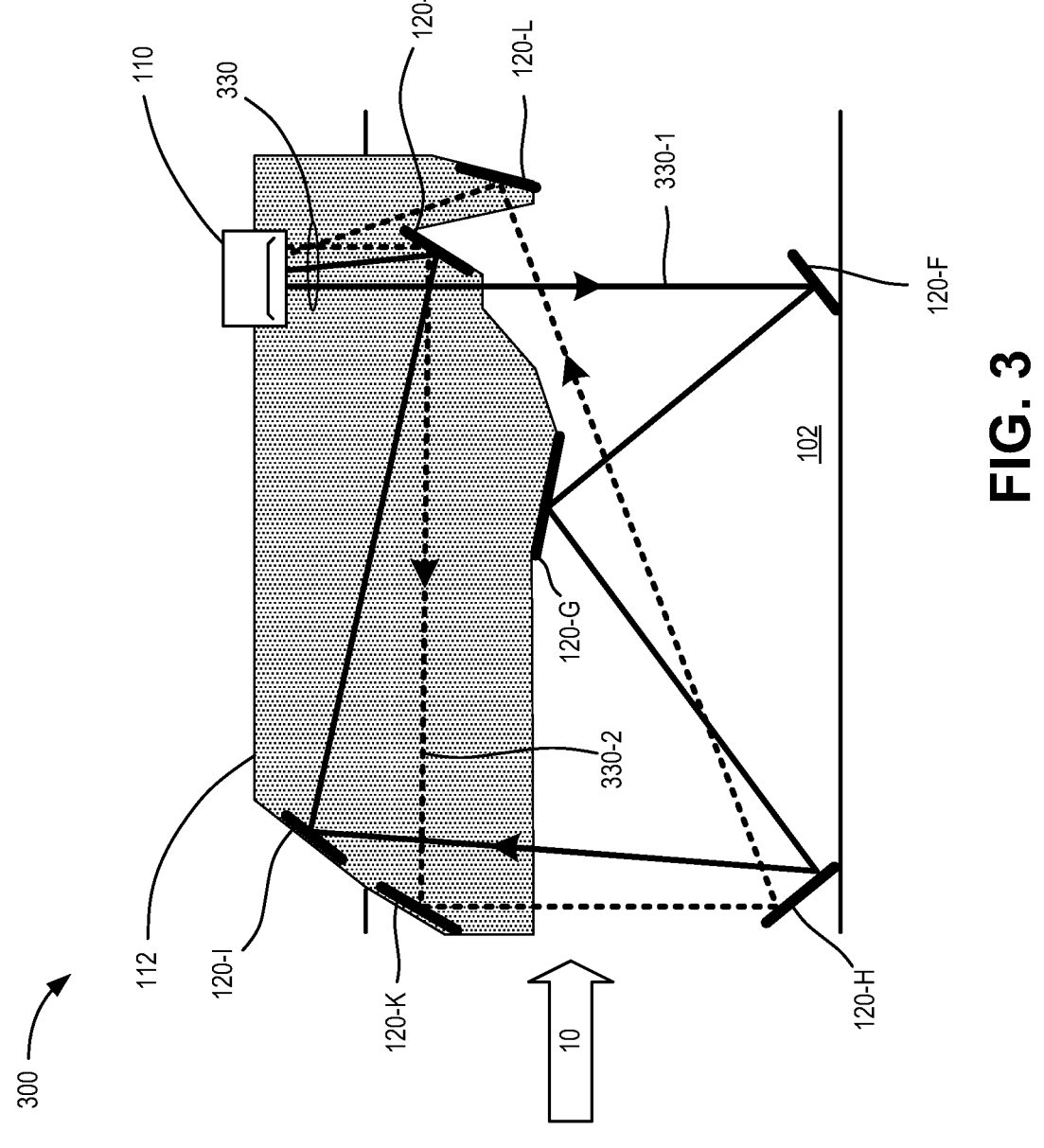
FIG. 3 is a schematic view of a portion of the meter assembly of FIG. 1, illustrating different length partial beam paths, according to another implementation.

FIG. 3 is an enlarged schematic view of a portion 300 of meter assembly 100 illustrating partial beam paths of unequal length from transducer 110. As shown in FIG. 3, partial beams are reflected along different paths with different total distances. Portion 300 may include a set of reflectors 120-F, 120-G, 120-H, 120-I, 120-J, 120-K, and 120-L (also referred to herein collectively as "reflectors 120" or generically as "reflector 120").

As shown in FIG. 3, a beam 330 from transducer 110 may be split into two partial beams 330-1 and 330-2. For example, reflector 120-J may be positioned such that a first portion 330-1 of beam 330 from transducer 110 initially bypasses reflector 120-J, while a second portion of beam 330 is initially reflected off reflector 120-J toward reflector 120-K. In some implementations, reflector 120-J may be positioned to split beam 330 into partial beams 330-1 and 330-2 of equal magnitude. In other implementations, reflector 120-J may be positioned or configured to split beam 330 into beams of unequal magnitude. For example, meter assembly 100 may be configured such that a partial beam with a longer path (e.g., partial beam 330-1) is given a larger percentage of beam 330 that a partial beam with a comparatively shorter path (e.g., partial beam 330-2).

In the configuration of FIG. 3, acoustic reflectors 120 are configured to reflect a signal 330 from transducer 110 into two partial beams 330-1 and 330-2 along different measurement paths, of different distances, back to transducer 110.

More particularly, the path of partial beam 330-1 may initially bypass reflector 120-J and follow the path F-G-H-I-J (e.g., substantially clockwise in FIG. 3) of reflectors 120, while partial beam 330-2 may initially reflect off reflector 120-J and follow the path J-K-H-L (e.g., substantially counter-clockwise in FIG. 3) of reflectors 120.

The path of partial beam 330-1 is comparatively longer than the path of partial beam 330-2. Thus, when the flow 10 in measuring channel 102 is zero, transducer 110 will receive partial beam 330-2 before the partial beam 330-1. Stated differently, the time of flight TOF$_1$ for partial beam 330-1 will be larger than the time of flight TOF$_2$ for partial beam 330-2 in zero-flow conditions.

According to an implementation, meter assembly 100 (including the arrangement of reflectors 120 in FIG. 3) may be designed such that flight times of partial beam 330-1 and partial beam 330-2 do not overlap even in the case of the most extreme anticipated reverse flow 10. That is, meter assembly 100 may be configured such that TOF$_1$ is always larger than TOF$_2$. In this way, delta time of flight (e.g., TOF$_1$-TOF$_2$) will always be positive. Reverse flow would result in small values of delta time of flight, and forward flow would result in larger values of delta time of flight.

Figure 4:
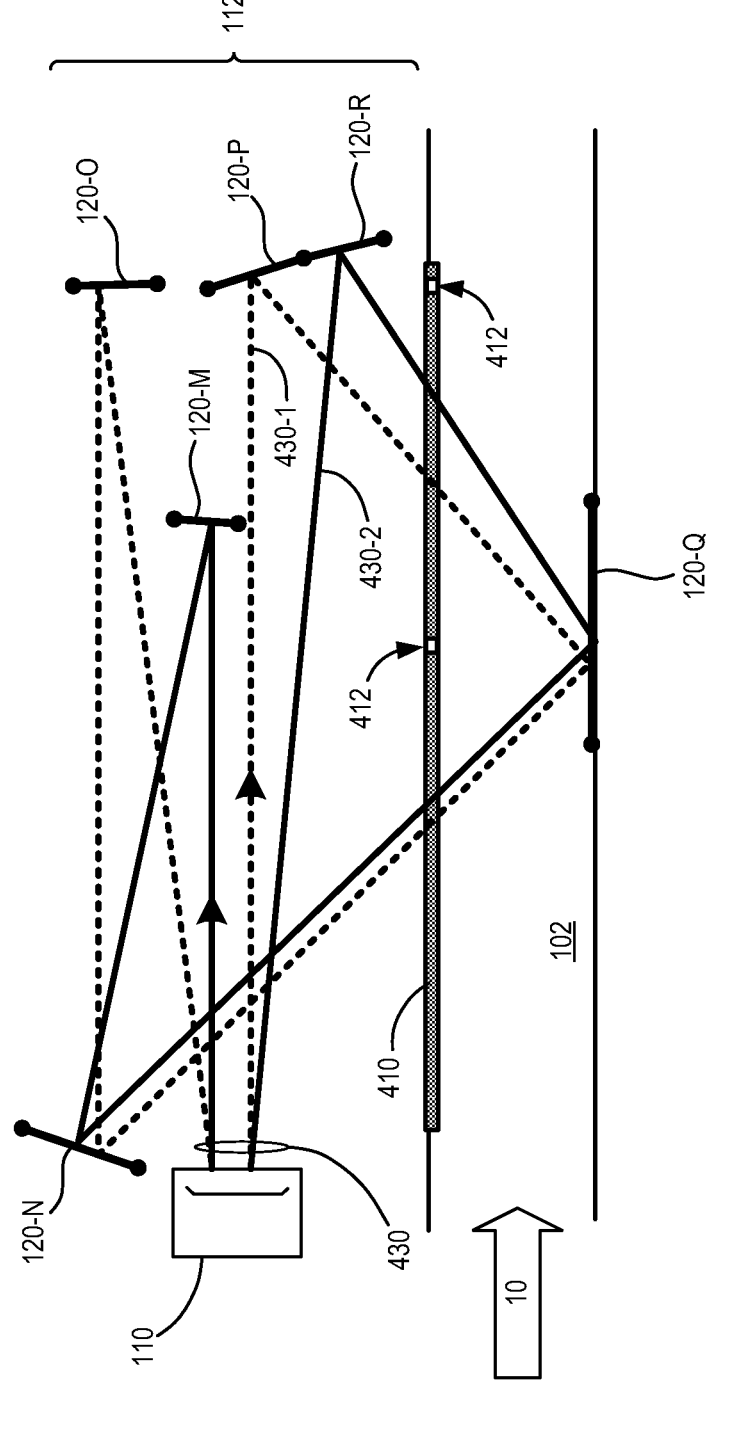
FIG. 4 is a schematic view of a portion of the meter assembly of FIG. 1, according to another implementation.

FIG. 4 is an enlarged schematic view of a portion 400 of meter assembly 100 according to another embodiment. As shown in FIG. 4, transducer 110 may be installed in-line with the path of flow 10 and commutatively coupled (e.g., via a wired connection) to other components of electronics module 108 (not shown in FIG. 4). Stationary medium 112 may be included as a fluid in measuring channel 102. Partial beams from a transducer 110 are reflected along different paths with different total distances. Portion 400 may include a set of reflectors 120-M, 120-N, 120-O, 120-P, and 120-Q (also referred to herein collectively as "reflectors 120" or generically as "reflector 120").

As shown in FIG. 4, stationary medium 112 may be integral with measuring channel 102. For example, stationary medium 112 may include a portion of measuring channel 102 that is segmented by barrier 410 to prevent flow through stationary medium 112. Transducer 110 may emit a beam 430 that is split into two partial beams 430-1 and 430-2 at reflector 120-M, which is positioned such that a partial beam 430-1 initially bypasses reflector 120-M, while partial beam 430-2 is initially reflected off reflector 120-M. Thus, the acoustic reflectors 120 reflect partial beams 430-1 and 430-2 along different measurement paths, of different distances, back to transducer 110. More particularly, partial beam 430-1 bypasses reflector 120-M and follows the path of reflectors 120 PQNO back to transducer 110, while partial beam 430-2 beam is reflected from reflector 120-M and follows the path of reflectors 120 MNQR back to transducer 110.

Barrier 410 may include an acoustically transparent material, such as ethyl vinyl acetate, room temperature vulcanizing silicone (RTV), an elastomer, SYLGARD, urethane, or the like. In some implementations, walls forming measuring channel 102 may be textured to dissipate unwanted reflections. Barrier 410 may divert/collect some fluid (e.g., water, gas, etc.) entering measuring channel 102 and constrain the fluid to prevent flow. Entrapped air (e.g., air bubbles) in the path of the partial beams, for example, can interfere with the acoustic impedance for the monitored fluid and reduce accuracy of metering system 100. Thus, according to an implementation, barrier 410 may include bleed holes 412 to release entrapped air that may otherwise collect along barrier 410. Bleed holes 412 may equalize pressure between stationary medium 112 and measuring channel 102, in cases where stationary medium 112 is the same fluid as that flowing in measuring channel 102 and if the pressures in the respective volumes change (e.g., due to changes in temperature or line pressure). The number, size, and location of bleed holes 410 may be configured to permit only minimal fluid flow, such that the fluid flow rate through stationary medium 112 remain effectively zero.

Figure 5:
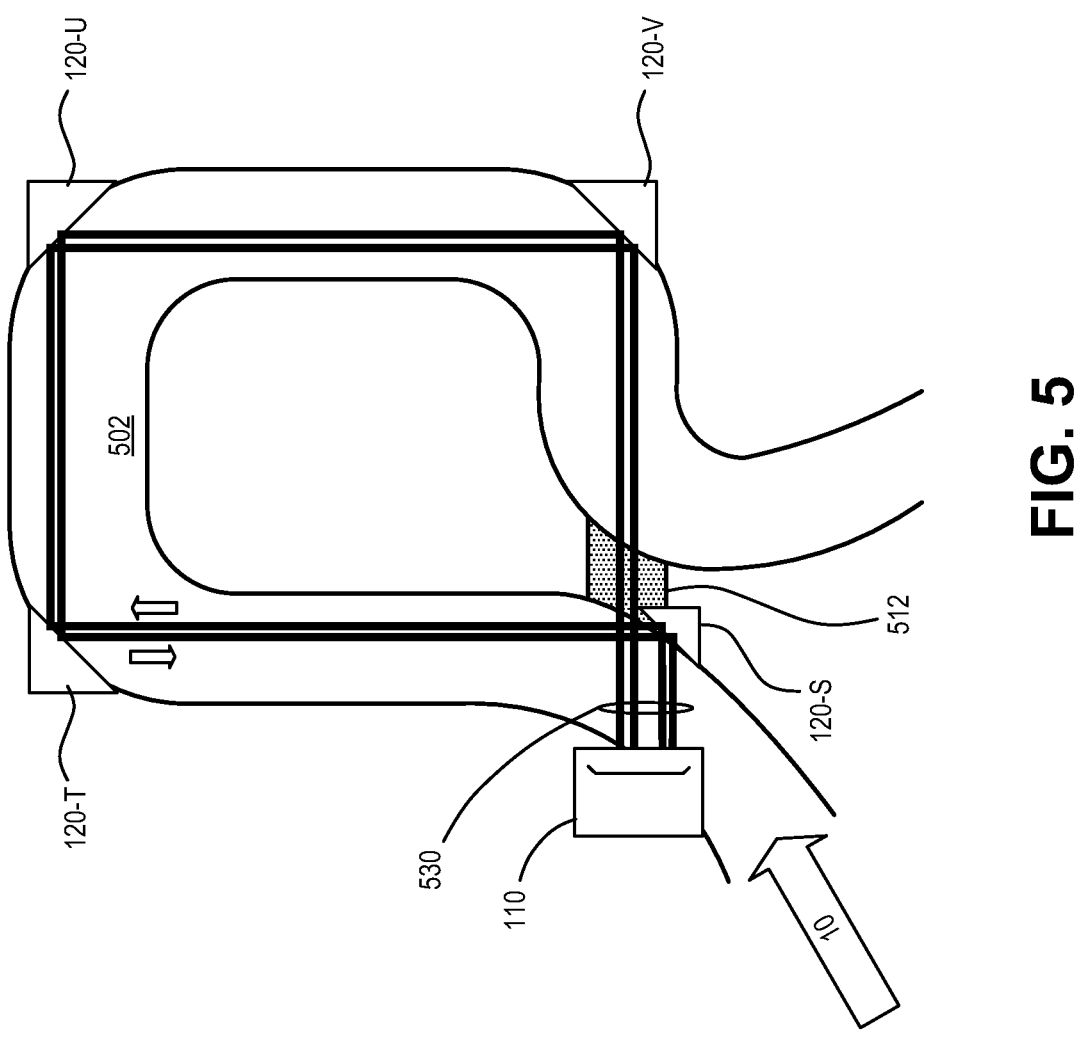
FIG. 5 is schematic view of a portion of the meter assembly with a serpentine measuring channel, according to another implementation.

FIG. 5 is an enlarged schematic view of a portion 500 of meter assembly 100 illustrating partial beam from transducer 110 though serpentine measuring channel 502, according to an implementation. Serpentine measuring channel 502 may be positioned between an inlet section 104 and an outlet section 106 (FIG. 1) of meter assembly 100.

As shown in FIG. 5, ultrasonic transducer 110 may emit a beam 530. Beam 530 may be split into two partial beams using a beam splitter, such as an arrangement of one or more reflectors 120. In the configuration of FIG. 5, beam 530 may be split by having reflector 120-S positioned in front of transducer 110 in a manner that does not entirely obstruct beam 530.

In the example configuration of FIG. 5, reflector 120-S may be positioned such that a first portion of beam 230 from transducer 110 is initially reflected off reflector 120-S, while a second portion of beam 230 initially bypasses reflector 120-S to pass through stationary medium 512 and reflect off reflector 120-V. Thus, the acoustic reflectors 120 reflect the two partial beams of ultrasonic beam 530 from transducer 110 along opposite measurement paths, of equal distance, back to transducer 110. More particularly, when transducer 110 emits a beam 530, a first partial beam gets reflected from reflector 120-S and follows the path of reflectors 120 STUV (e.g., substantially clockwise), while a second partial beam bypasses reflector 120-S and follows the path of reflectors VUTS (e.g., substantially counter-clockwise).

Using the serpentine path of measuring channel 502, the first partial beam of ultrasonic beam 530 may traverse almost the entire distance of measuring channel 502 aligned with flow 10. Conversely, the second partial beam of ultrasonic beam 530 may traverse almost the entire distance of measuring channel 502 against flow 10. Stationary medium 512 may provide a transition interface for the first and second partial beams of beam 530 to cross adjacent portions of measuring channel 502.

Similar to methods described above, electronics module 108 associated with transducer 110 may determine a ΔTOF between the first and second partial beams. The difference in the upstream and downstream flight times may be applied to the geometry of the reflectors 120 and measuring channel 502 to calculate flow rate of fluid through measuring channel 502.

Figure 6:
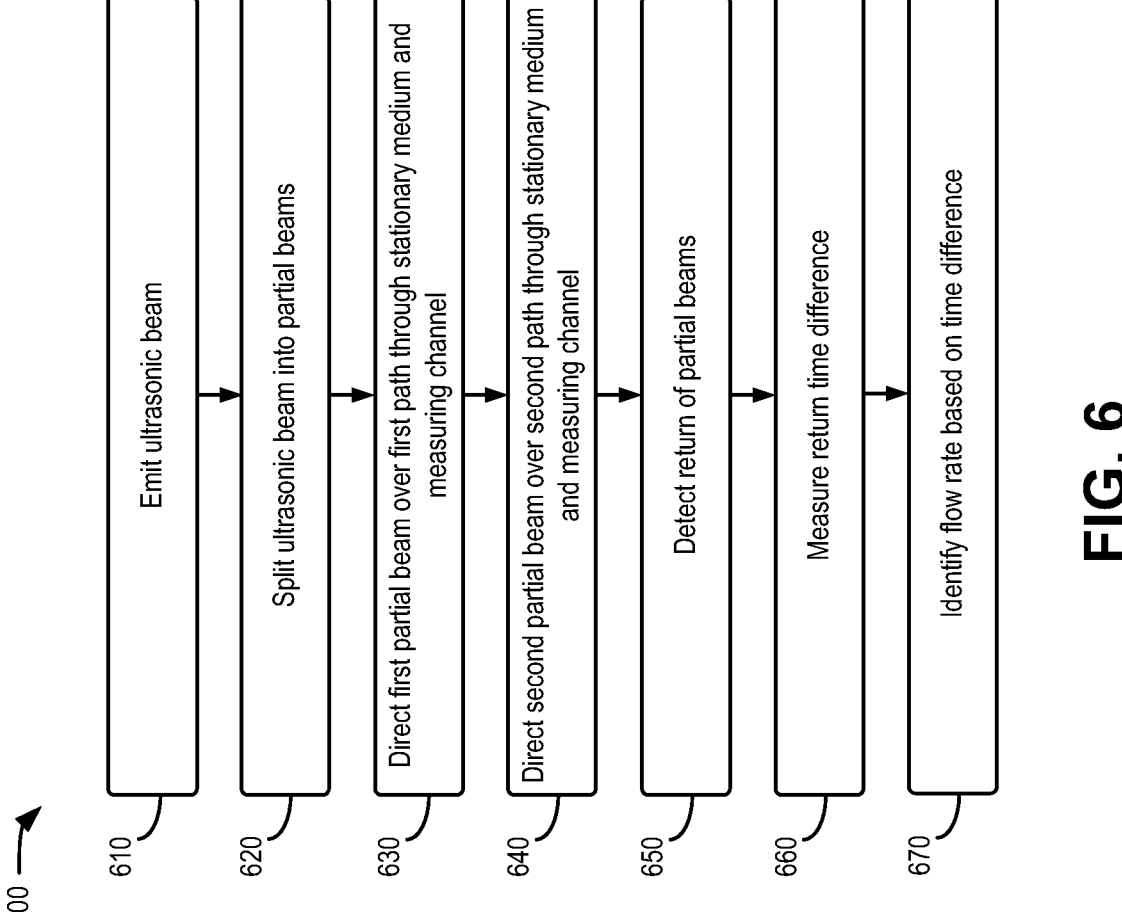
FIG. 6 is a flow diagram illustrating an exemplary process for measuring a flow rate using an ultrasonic meter with a single transducer, according to an implementation.

FIG. 6 is a process flow illustrating an exemplary process 600 for measuring a flow rate using an ultrasonic meter with a single transducer, according to an implementation described herein. In one implementation, process 600 may be performed by meter assembly 100 (e.g., equipped with one of portions 200, 300, 400, or 500).

Process 600 may include emitting an ultrasonic beam from a single transducer (block 610), and splitting the ultrasonic beam into two partial beams (block 620). For example, transducer 110 may emit an ultrasonic beam toward a beam-splitter in meter assembly 100, which may split the beam into at least two partial beams. The beams may be divided equally or unequally with respect to magnitude.

Process 600 may also include directing the first partial beam, via the a path, through a stationary medium and over a first net distance of a measuring channel (block 630), and directing the second partial beam, via a second path, over a second net distance of the measuring channel and through the stationary medium (block 640). For example, reflectors 120 in measuring channel 102 and stationary medium 112 may reflect the partial beams over different paths that each return to transducer 110. The stationary medium may provide the partial beams with different entry points into measuring channel 102. In the example of FIGS. 2 and 5, the different paths may follow the same pattern of reflectors 120 in opposite directions. In the examples of FIGS. 3 and 4, the different paths may follow different reflector patterns resulting in different path lengths.

Process 600 may further include detecting at the transducer a return of the first partial beam and the second partial beam (block 650), measuring a time difference between a first time of flight of the first partial beam and a second time of flight of the second partial beam (block 660), and identifying a measurement of a fluid flow through the measuring channel based on the time difference (block 670). For example, after emitting the ultrasonic beam (e.g., beam 230, 330, 430, 530, etc.), transducer 110 may receive back two partial beams at different times, which may be detected/recorded to a required level of precision (e.g., ±5 picoseconds). In some instances, the arrival times of the partial beams may be associated with different paths. In other instances, different arrival times may be detected and not associated with a particular path. Processing unit 124 may apply the measured time difference to the geometry of the reflectors and dimensions of the measuring channel and path lengths to determine a flow rate.

Systems and methods described herein provide a metering system that uses a single transducer to determine flow rate. The meter assembly emits an ultrasonic beam from the transducer and splits the ultrasonic beam into a first partial beam and a second partial beam. The first partial beam is transmitted over a first path that returns to the transducer, and the second partial beam is transmitted over a second path that returns to the transducer. The first path goes through a stationary medium and over a first net distance of a measuring channel. The second path goes over a second net distance of the measuring channel and through the stationary medium. The meter assembly detects the return of the first partial beam and the second partial beam, measures a time difference between the return times, and identifies a measurement of a fluid flow through the measuring channel based on the time difference. In some implementations, the meter assembly is configured such that the first time of flight is different from the second time of flight when a rate of fluid flow through the measuring channel is zero.

An ultrasonic meter according embodiments described herein may provide similar functionality to a traditional ultrasonic meter that uses transducer pairs. A single transducer design may provide reduced transducer costs over a design using transducer pairs. The cost of supporting electronics may also be lower than conventional meters because only one transducer needs to be supported. In addition, for each delta time of flight measurement, only one signal is emitted. This may reduce the power associated with each measurement by up to fifty percent over conventional designs. Consequently, a single-transducer design (e.g., meter assembly 100) may achieve functional requirements more efficiently than designs using transducer pairs. For example, a battery or battery pack (e.g., battery 122) that can support, for example, 10 years of operation at a 250 ms sampling interval with a traditional ultrasonic meter design might support 20 years of operation at a 250 ms sampling interval or 10 years of operation at a 125 ms sampling interval; or a smaller battery or battery pack may be specified while maintaining support for 10 years of operation at a 250 ms sampling interval.

The foregoing description of implementations provides illustration and description, but is not intended to be exhaustive or to limit the invention to the precise form disclosed. Modifications and variations are possible in light of the above teachings or may be acquired from practice of the invention. For example, while illustrations have been provided with certain arrangements of reflectors 120, in other implementations, a different arrangement or number of reflectors may be used to provide partial beam paths. As another example, configurations that use a stationary medium for only one partial beam path may be used. In still other implementations, multiple single-transducer, split beam paths may be used in different portions of measuring channel 102. Furthermore, the term beam may refer to any non-continuous signal that enables measurement of time differentials.

Use of ordinal terms such as "first," "second," "third," etc., in the claims to modify a claim element does not by itself connote any priority, precedence, or order of one claim element over another, the temporal order in which acts of a method are performed, the temporal order in which instructions are performed, etc., but are used merely as labels to distinguish one claim element having a certain name from another element having a same name (but for use of the ordinal term) to distinguish the claim elements.

No element, act, or instruction used in the description of the present application should be construed as critical or essential to the invention unless explicitly described as such. Also, as used herein, the articles "a," "an," and "the" are intended to include one or more items. Further, the phrase "based on" is intended to mean "based, at least in part, on" unless explicitly stated otherwise. The term "and/or" is intended to be interpreted to include any and all combinations of one or more of the associated items. The word "exemplary" is used herein to mean "serving as an example." Any embodiment or implementation described as "exemplary" is not necessarily to be construed as preferred or advantageous over other embodiments or implementations.

As set forth in this description and illustrated by the drawings, reference is made to "an exemplary embodiment," "an embodiment," "embodiments," etc., which may include a particular feature, structure or characteristic in connection with an embodiment(s). However, the use of the phrase or term "an embodiment," "embodiments," etc., in various places in the specification does not necessarily refer to all embodiments described, nor does it necessarily refer to the same embodiment, nor are separate or alternative embodiments necessarily mutually exclusive of other embodiment(s). The same applies to the term "implementation," "implementations," etc.

With reference to the use of the words "comprise" or "comprises" or "comprising" in the foregoing description and/or in the following claims, unless the context requires otherwise, those words are used on the basis and clear understanding that they are to be interpreted inclusively, rather than exclusively, and that each of those words is to be so interpreted in construing the foregoing description and the following claims.

It is to be understood that any given elements of the disclosed embodiments of the invention may be embodied in a single structure, a single step, a single substance, or the like. Similarly, a given element of the disclosed embodiment may be embodied in multiple structures, steps, substances, or the like.

All structural and functional equivalents to the elements of the various aspects set forth in this disclosure that are known or later come to be known to those of ordinary skill in the art are expressly incorporated herein by reference and are intended to be encompassed by the claims.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

The invention claimed is:

1. A method performed by a meter assembly, the method comprising:

emitting an ultrasonic beam from a single transducer;

splitting the ultrasonic beam into a first partial beam and a second partial beam, wherein the first partial beam is transmitted over a first path that returns to the transducer, and wherein the second partial beam is transmitted over a second path that returns to the transducer;

directing the first partial beam, via the first path, through a stationary medium and over a first net distance of a measuring channel;

directing the second partial beam, via the second path, over a second net distance of the measuring channel and through the stationary medium;

detecting at the transducer a return of the first partial beam and a return of the second partial beam;

measuring a time difference, based on the detecting of the first partial beam and the second partial beam, between a first time of flight of the first partial beam and a second time of flight of the second partial beam; and determining a measurement of a fluid flow through the measuring channel based on the time difference.

2. The method of claim 1, wherein emitting the ultrasonic beam includes emitting one of a pulse or a wave packet.

3. The method of claim 1, wherein splitting the ultrasonic beam includes one or more of:

directing the ultrasonic beam to a reflector that does not entirely obstruct the ultrasonic beam, directing the ultrasonic beam onto a reflector that has at least two different reflective surfaces, or directing the ultrasonic beam onto a partial reflector that partially reflects the ultrasonic beam and allows a portion of the ultrasonic beam to pass through.

4. The method of claim 1, wherein the stationary medium includes a solid material.

5. The method of claim 1, wherein the stationary medium includes a fluid.

6. The method of claim 1, wherein directing the first partial beam through the measuring channel includes exposing the first partial beam to the fluid flow through the measuring channel in a net streamwise distance in the direction of the fluid flow; and wherein directing the second partial beam through the measuring channel includes exposing the first partial beam to the fluid flow through the measuring channel in a net streamwise distance in a direction opposite the fluid flow.

7. The method of claim 1, wherein the first time of flight is different from the second time of flight when a rate of fluid flow through the measuring channel is zero.

8. The method of claim 1, wherein the stationary medium and a fluid of the fluid flow are the same fluid.

9. A fluid meter assembly, comprising:

a measuring channel;

a stationary medium;

an electronics assembly including a transducer configured to emit an ultrasonic beam;

a beam splitter configured to split the ultrasonic beam into a first partial beam and a second partial beam;

a first set of reflectors configured to direct the first partial beam over a first path that returns to the electronics assembly, wherein the first path includes the stationary medium and a first net distance of a measuring channel; and a second set of reflectors configured to direct the second partial beam over a second path that returns to the electronics assembly, wherein the second path, includes a second net distance of the measuring channel and the stationary medium;

wherein the electronics assembly is configured to:

detect a return of the first partial beam and a return of the second partial beam, measure a time difference, between a first time of flight of the first partial beam and a second time of flight of the second partial beam, and determine a measurement of a fluid flow through the measuring channel based on the time difference.

10. The fluid meter assembly of claim 9, wherein transducer is configured to transmit the ultrasonic beam as one of a pulse or a wave packet.

11. The fluid meter assembly of claim 9, wherein the beam splitter comprises:

a reflector that does not entirely obstruct the ultrasonic beam, a reflector that has at least two different reflective surfaces, or a partial reflector that partially reflects the ultrasonic beam and allows a portion of the ultrasonic beam to pass through.

12. The fluid meter assembly of claim 9, wherein the stationary medium includes a solid material.

13. The fluid meter assembly of claim 9, wherein the stationary medium includes a fluid.

14. The fluid meter assembly of claim 9, wherein the first time of flight is different from the second time of flight when a rate of fluid flow through the measuring channel is zero.

15. The fluid meter assembly of claim 9, wherein a length of the first path is different than a length of the second path.

16. The fluid meter assembly of claim 9, wherein the stationary medium and a fluid of the fluid flow are the same.

17. An electronics module for a fluid meter, the electronics module comprising:

a transducer configured to:

emit an ultrasonic beam into a measuring channel, and detect return of a first partial beam and return of a second partial beam of the ultrasonic beam; and a processor configured to:

measure a time difference, based on the detecting, between a first time of flight of the first partial beam and a second time of flight of the second partial beam, and determine a measurement of a fluid flow through the measuring channel based on the time difference.

18. The electronics module of claim 17, wherein the measurement of the fluid flow is an absolute value.

19. The electronics module of claim 17, wherein the measurement of the fluid flow includes a directional value.

20. The electronics module of claim 17, wherein the processor is further configured to:

associate the first partial beam with a first beam path having a first path length, and associate the second partial beam with a second beam path having a second path length.

* * * * *